(12) United States Patent
Zhang et al.

(10) Patent No.: US 9,820,054 B2
(45) Date of Patent: Nov. 14, 2017

(54) ELECTROMAGNETIC TRANSDUCER HAVING A SUSPENDING RING DISPOSED FOR INCREASED VIBRATING SPACE

(71) Applicants: Guqing Zhang, Shenzhen (CN); Zhongping Li, Shenzhen (CN)

(72) Inventors: Guqing Zhang, Shenzhen (CN); Zhongping Li, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 529 days.

(21) Appl. No.: 14/535,691

(22) Filed: Nov. 7, 2014

(65) Prior Publication Data
US 2015/0188398 A1    Jul. 2, 2015

(30) Foreign Application Priority Data
Dec. 31, 2013   (CN) .......................... 2013 1 0754011

(51) Int. Cl.
*H04R 9/06*     (2006.01)
*H02K 33/18*    (2006.01)
(Continued)

(52) U.S. Cl.
CPC .............. *H04R 9/06* (2013.01); *H02K 33/18* (2013.01); *H04R 9/02* (2013.01); *H04R 7/04* (2013.01);
(Continued)

(58) Field of Classification Search
CPC ........ H02K 33/00; H02K 33/02; H02K 33/15; H02K 33/18; H04R 2400/03;
(Continued)

(56) References Cited

U.S. PATENT DOCUMENTS 3,312,841 A * 4/1967 Makino .................. H02K 33/04
                                                          310/15
6,568,503 B2 * 5/2003 Proni ....................... H04R 7/20
                                                          181/171
(Continued)

FOREIGN PATENT DOCUMENTS

CN       202183861 U *  4/2012   ............. H04R 9/043
CN       203747986 U *  7/2014   ........... H04R 31/006

OTHER PUBLICATIONS

Huang et al., English Translation of CN202183861, Apr. 4, 2012.*
Wang et al., English Translation of CN203747986, Jul. 30, 2014.*

Primary Examiner — Bernard Rojas
Assistant Examiner — Rashad Johnson
(74) Attorney, Agent, or Firm — Na Xu; IPro, PLLC

(57) ABSTRACT

An electromagnetic transducer is disclosed in the present invention. The electromagnetic transducer includes a frame comprising a receiving space, an upper surface and a lower surface opposite to the upper surface; a suspension including a suspending ring facing the receiving space and at least one pair of elastic arms with projections thereof disposed in an outline of the frame, wherein each of the elastic arms includes a fixing portion mounted on the lower surface and an vibration portion connected with the fixing portion, spaced from the lower surface and providing an vibration approaching and away from the lower surface; a magnetic circuit unit surrounded by the suspending ring for being elastically supported by the suspending ring in the receiving space; and an vibration unit assembled with the frame and facing the magnetic circuit unit.

10 Claims, 6 Drawing Sheets

(51) Int. Cl.
*H04R 9/02* (2006.01)
*H04R 7/04* (2006.01)

(52) U.S. Cl.
CPC ...... *H04R 2400/03* (2013.01); *H04R 2400/07* (2013.01)

(58) Field of Classification Search
CPC ........ H04R 2400/07; H04R 7/00; H04R 7/02; H04R 7/04; H04R 7/12; H04R 7/20; H04R 9/00; H04R 9/02; H04R 9/04; H04R 9/043; H04R 9/045
USPC ........ 181/171, 172, 173; 310/15, 16, 25, 28; 335/185, 19, 193; 381/398, 399, 400, 381/433
See application file for complete search history.

(56) References Cited

U.S. PATENT DOCUMENTS

| | | | |
|---|---|---|---|
| 7,633,190 B2 * | 12/2009 | Liu | H02K 41/0356 310/15 |
| 2004/0170298 A1 * | 9/2004 | Ohta | H04R 1/02 381/433 |
| 2011/0123061 A1 * | 5/2011 | Kamimura | H04R 9/025 381/412 |
| 2013/0133975 A1 * | 5/2013 | Kim | H04R 7/16 181/166 |
| 2017/0034626 A1 * | 2/2017 | Zhang | H04R 9/025 |

* cited by examiner

ELECTROMAGNETIC TRANSDUCER HAVING A SUSPENDING RING DISPOSED FOR INCREASED VIBRATING SPACE

FIELD OF THE INVENTION

The present invention relates to electromagnetic transducers, and more specifically to an electromagnetic transducer for providing multiple functions.

DESCRIPTION OF RELATED ART

With the rapid development of the portable devices such as cellular phones, people request for more and more functions. In the field of music enjoying of the cellular phone, a multifunction device enabling providing both audible and tactile sensations for amusement has already been widely used, which boosts the quick development of multifunctional devices.

An electromagnetic transducer in the related art comprises a frame having a receiving space, a suspension received in the receiving space and assembled with the frame, and a magnetic circuit unit suspended in the receiving space by the suspension. With the construction of suspension received in the receiving space, the suspension occupies the space and thus the vibrating space for the magnetic circuit unit is accordingly reduced, which leads to failure of the transducer. Thus, the electromagnetic transducer couldn't satisfy users' demands for good performance.

Therefore, it is desirable to provide a new multifunctional electromagnetic transducer for solving the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

Reference will now be made to describe the exemplary embodiment of the present invention in detail.

Figure 1:
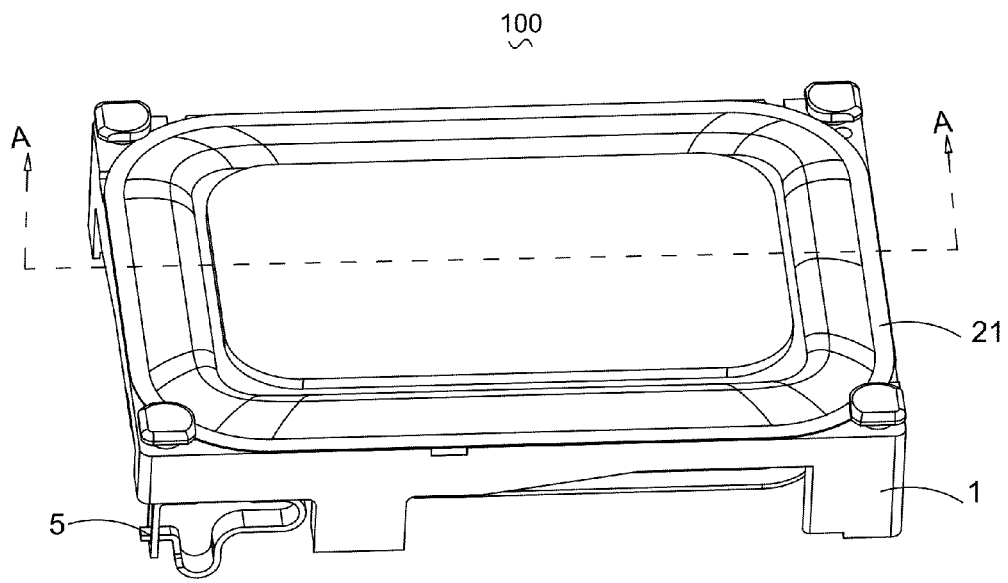
FIG. 1 is an illustrative isometric view of an electromagnetic transducer according to an exemplary embodiment of the present invention.
Figure 2:
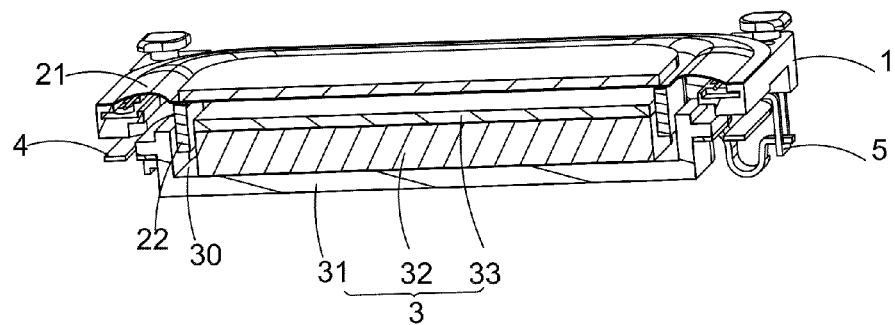
FIG. 2 is a cross-sectional view of the electromagnetic transducer taken along line A-A of FIG. 1.
Figure 3:
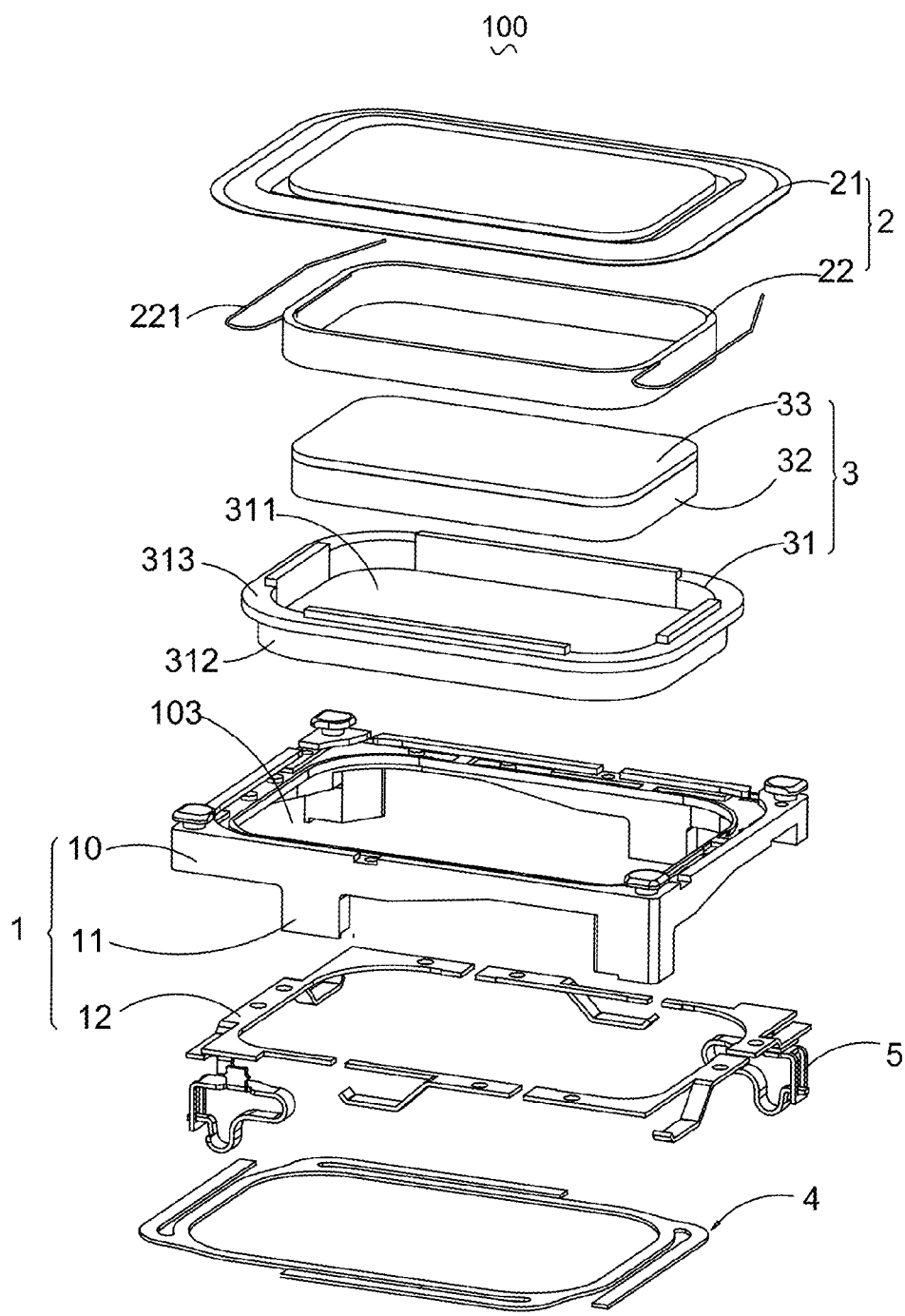
FIG. 3 is an exploded view of the electromagnetic transducer shown in FIG. 1.

Referring to FIGS. 1-3, an electromagnetic transducer 100 comprises a frame 1, a vibration unit 2 fixed to the frame 1 and defining a vibration direction, a suspension 4 movably mounted in the frame 1 and vibrating along the vibration direction, a magnetic circuit unit 3 suspended in the frame 1 by the suspension 4, and a pair of terminals 5 electrically connecting the vibration unit 2 to an outer electric circuit.

The vibration unit 2 includes a voice coil 22 and a diaphragm 21 coupled to the voice coil 22. The diaphragm 21 is made from stretchable and soft material. The voice coil 22 includes a pair of wire leads 221 extending outward from edges of the voice coil 22.

The magnetic circuit unit 3 comprises a yoke 31, a magnet 32 received in the yoke 31 and a pole plate 33 attached on the magnet 32. In this embodiment, the yoke 31 includes a bottom wall 311, a sidewall 312 extending from the bottom wall 311 toward the vibration unit 2 and a flange 313 extending outward from a top surface of the sidewall 312 along a direction parallel to the bottom wall 311. The magnet 32 is positioned in a central portion of the bottom wall 311 and spaced from an inner surface of the sidewall 312. Thus, a magnetic gap 30 is accordingly formed between the magnet 32 and the inner surface of the sidewall 312 for partially receiving the voice coil 22.

Figure 6:
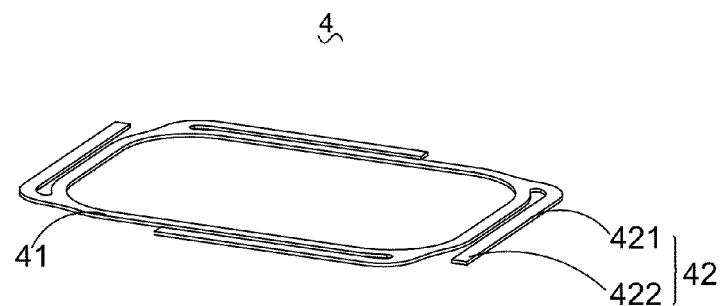
FIG. 6 is an illustrative isometric view of a suspension of the electromagnetic transducer shown in FIG. 3.

Referring to FIG. 6, the suspension 4 comprises a suspending ring 41 for elastically supporting the magnetic circuit unit 3 and at least a pair of elastic arms 42 connected with the suspending ring 41. Optionally, two pairs of elastic arms 42 are provided in the suspension 4, which surround the suspending ring 41 in a clockwise direction. Each elastic arm 42 comprises an vibration portion 421 connected with the suspending ring 41 for undergoing elastic deformation and supplying elastic force to the magnetic circuit unit 3 while vibrating, and a fixing portion 422 extending straightly from the vibration portion 421 for connecting to the frame 1.

Figure 4:
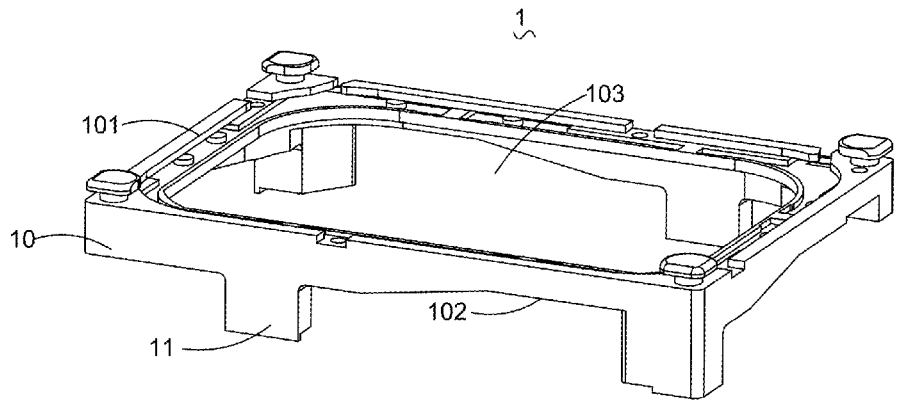
FIG. 4 is an illustrative isometric view of a frame of the electromagnetic transducer shown in FIG. 3.
Figure 5:
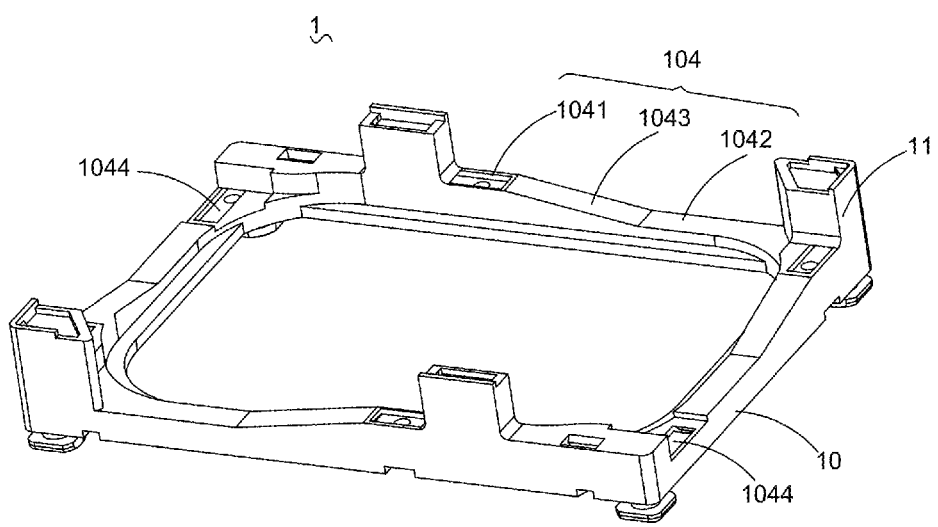
FIG. 5 is an illustrative isometric view of the frame shown in FIG. 4, but from another aspect.

Referring to FIG. 4 and FIG. 5, the frame 1 comprises a base case 10 including a receiving space 103 and at least two supporting legs 11 connected with the base case 10 for supporting the frame 1. In this embodiment, four supporting legs 11 are provided in the frame 1 for improving the stability of the frame 1. The four supporting legs 11 locate spaced from each other. The base case 10 is substantially rectangle shaped and comprises an upper surface 101 facing the vibration unit 2 and a lower surface 102 opposite to the upper surface 101.

Especially referring to FIG. 5, the base case 10 further comprises four connecting segments 104 formed on the lower surface 102 respectively for connecting with the suspension 4. Each of the connecting segments 104 comprises a first connecting portion 1041, a prevent collision portion 1042, and a inclining portion 1043 extending from the first connecting portion 1041 to the prevent collision portion 1042. The vertical distance between the first connecting portion 1041 and the upper surface 101, i.e. a distance along the vibration direction, is higher than that between the prevent collision portion 1042 and the upper surface 101. Optionally, the base case 10 further comprises a pair of second connecting portions 1044 formed on two corners of the lower surface 102 of the base case 10 and adjacent to corresponding connecting segment 104, which locate symmetrically about a center of the base case 10.

Figure 7:
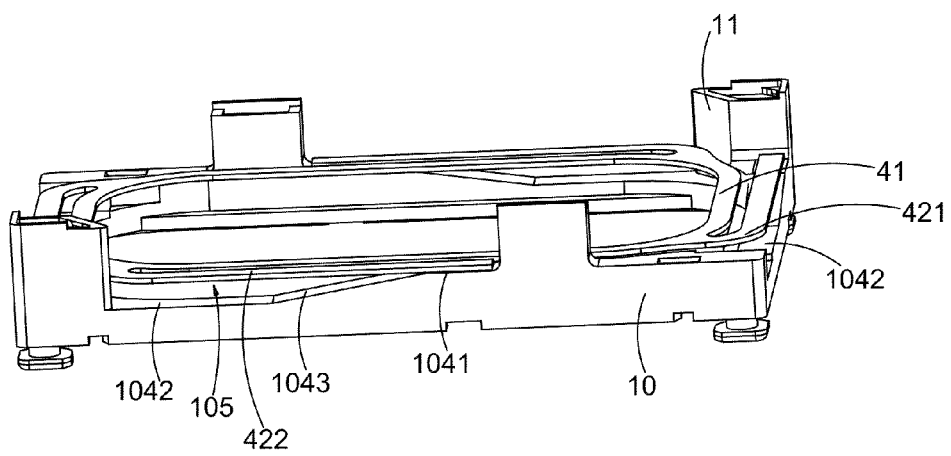
FIG. 7 is an illustrative assembled view of a combination of the suspension and the frame shown in FIG. 3.
Figure 8:
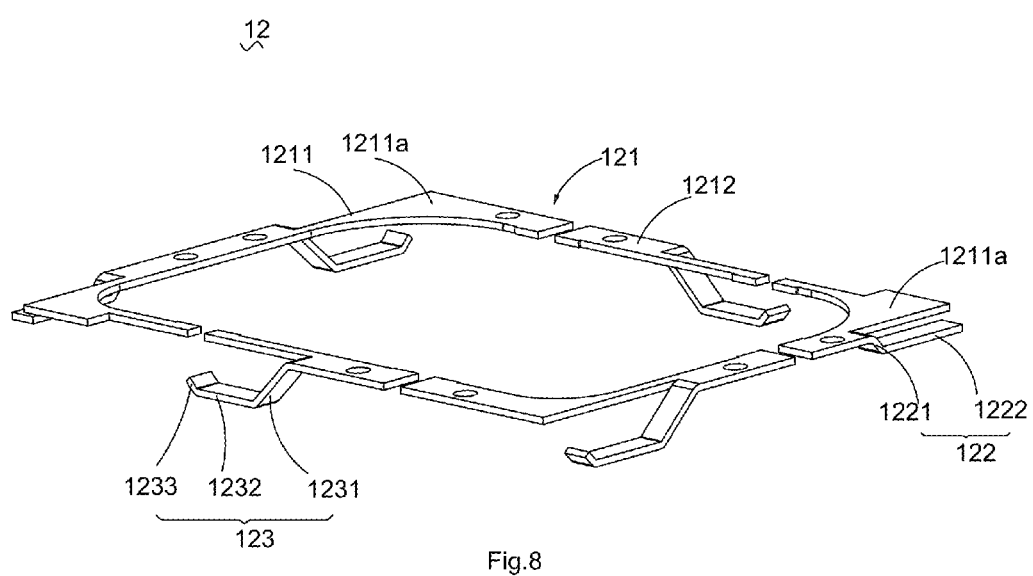
FIG. 8 is an illustrative isometric view of an assistant member of the electromagnetic transducer shown in FIG. 3.
Figure 9:
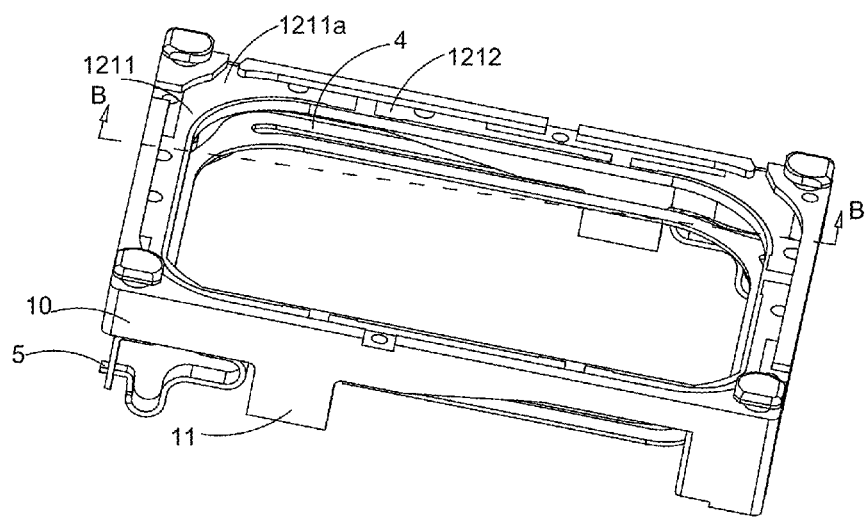
FIG. 9 is an illustrative assembled view of a combination of the assistant member, the frame and the suspension shown in FIG. 3.
Figure 10:
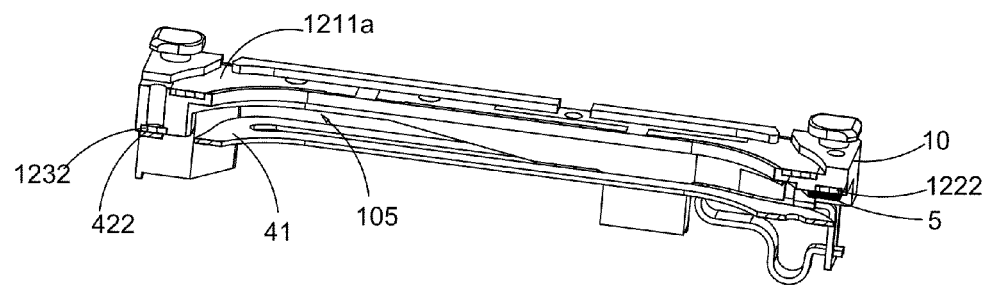
FIG. 10 is a cross-sectional view of the combination of the assistant member, the frame and the suspension, taken along line B-B of FIG. 7.
Figure 11:
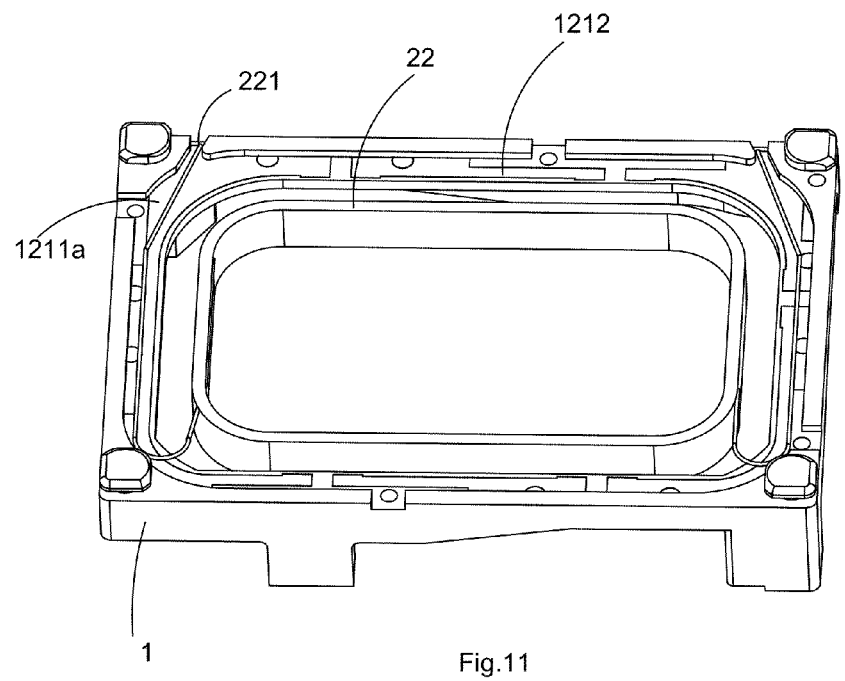
FIG. 11 is an illustrative assembled view of a combination of the assistant member, the frame, the suspension, a magnetic circuit unit and a voice coil of the electromagnetic transducer shown in FIG. 3.

Referring to FIG. 7 and FIG. 2, when assembled, the suspending ring 41 face to the receiving space 103, the fixing portion 422 of the suspension 4 is mounted on the first connecting portion 1041 of the frame 1 by gluing and the vibration portion 421 is arranged so that an interval is formed between the vibration portion 421 and the lower surface 102 of the frame 1. In this embodiment, projections of the elastic arms are disposed in an outline of the frame. A space 105 is formed between the vibration portion 421 of the suspension 4 and the prevent collision portion 1042 to supply sufficient vibrating space for the vibration portion 421 of the suspension 4, thereby, the vibration portion 421 can vibrate toward and away from the lower surface 102. The magnetic circuit unit 3 passes through the receiving space 103, locates in the suspending ring 41 and elastically supported by the suspending ring 41. In such case, the suspension 4 will not occupy the receiving space 103 of the frame 1, and thus increase the vibrating space of the magnetic circuit unit 3.

Referring to FIG. 8 through FIG. 11, the frame 1 further comprises an assistant member 12 made of metal material and integrated with the base case 10. The assistant member 12 comprises a ring-shaped base body 121 attached on the upper surface 101, and at least two first connecting arms 123 extending from the base body 121 toward the lower surface 102, penetrating the base case 10 from the upper surface 101 to the lower surface 102 and exposed from the lower surface 102.

The base body 121 comprises a pair of straight plates 1212 opposite to each other and a pair of U-shaped plates 1211 opposite to each other. Each straight plate 1212 locates between the two U-shaped plates 1211 and spaced from the U-shaped plates 1211. The straight plates 1212 and U-shaped plates 1211 are arranged so that the base body 121 is shaped to match the base case 10.

In this embodiment, four first connecting arms 123 are provided, which are connected to the straight plates 1212 and U-shaped plates 1211 respectively, surrounding the base body 121 in a clockwise direction, and corresponding to the elastic arms 42 of the suspension 4 one by one. Each first connecting arm 123 comprises a first bending portion 1231 extending obliquely from the base body 121 toward the lower surface 102, a first soldering pad 1232 extending from the first bending portion 1231 along a direction parallel to the base body 121, and a second bending portion 1233 extending obliquely from the first soldering pad 1232 toward the upper surface 101. In this embodiment, the first soldering pad 1232 is exposed from the first connecting portion 104, and the fixing portion 422 is connected with the first soldering pad 1232 by soldering, which can increase the connection strength between the suspension 4 and the frame 1.

The assistant member 12 further comprises a pair of second connecting arms 122 extending obliquely from the U-shaped plates 1211 toward the lower surface 102 for electrically soldering the terminals 5 thereon. The second connecting arms 122 locate symmetrically about a center of the base body 121 and corresponding to the second connecting portion 1044 one by one. Each second connecting arm 122 comprises a third bending portion 1221 extending obliquely from the U-shaped plate 1211 toward the lower surface 102 and a second soldering pad 1222 extending from the third bending portion 1221 along a direction parallel to the U-shaped plate 1211 and exposed from the second connecting portion 1044 for wedding to the terminals 5.

The assistant member 12 further comprises a pair of third soldering pads 1211a formed on the corners of the U-shaped plates 1211 respectively for electrically soldering the wire leads 221 of the voice coil 22 thereon. The third soldering pads 1211 allocate on the same side of the base body 121.

It is to be understood, however, that even though numerous characteristics and advantages of the present disclosure have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electromagnetic transducer comprising,
   a frame comprising a receiving space, an upper surface and a lower surface opposite to the upper surface;
   a suspension comprising a suspending ring facing the receiving space and at least one pair of elastic arms with projections thereof disposed in an outline of the frame, wherein each of the elastic arms comprises a fixing portion mounted on the lower surface and an vibration portion connected with the fixing portion, spaced from the lower surface and vibrating toward and away from the lower surface;
   a magnetic circuit unit surrounded by the suspending ring for being elastically supported by the suspending ring in the receiving space; and
   an vibration unit assembled with the frame and facing the magnetic circuit unit; wherein,
   the frame further comprises an assistant member integrated with the frame and connected with the suspension; the assistant member includes a base body attached on the upper surface, and at least two first connecting arms extending from the base body toward the lower surface, penetrating the base case from the upper surface to the lower surface and exposed from the lower surface.

2. he electromagnetic transducer of claim 1, wherein the at least one pair of elastic arms is arranged in parallel and opposite to each other.

3. The electromagnetic transducer of claim 1, wherein the suspension comprises two pairs of elastic arms connected with the suspension ring and surrounding the suspending ring.

4. The electromagnetic transducer of claim 3, wherein the frame further comprises a plurality of connecting segments formed on the lower surface, each connecting segment comprises a first connecting portion, a prevent collision portion, and a inclining portion extending from the first connecting portion to the prevent collision portion; wherein a vertical distance between the first connecting portion and the upper surface is higher than that between the prevent collision portion and the upper surface.

5. The electromagnetic transducer of claim 4, wherein a space is formed between each vibration portion and the prevent collision portion for supplying vibrating space to the suspension.

6. The electromagnetic transducer of claim 1 wherein each first connecting arm comprises a first bending portion extending obliquely from the base body toward the lower surface and a first soldering pad extending from the first bending portion in a direction parallel to the base body and exposed from the lower surface for connecting with the elastic arm.

7. An electromagnetic transducer comprising,
  a frame comprising a receiving space, an upper surface and a lower surface opposite to the upper surface;
  a spring plate comprising a spring ring facing the receiving space and four elastic arms connected with the spring ring and surrounding the spring ring, a projection of each elastic arm disposed in an outline of the frame, wherein, each elastic arm comprises a first portion spaced from the lower surface at an predetermined interval and a second portion extending straightly from the first portion and fixed to the lower surface; and
  a magnetic circuit unit surrounded by the spring ring and suspended in the receiving space of the frame by the spring ring;
  a vibration unit facing the magnetic circuit unit and fixed to the frame; wherein,
  the frame further comprises an assistant member integrated with the frame and connected with the spring plate; the assistant member includes a base body attached on the upper surface, and at least two first connecting arms extending from the base body toward the lower surface, penetrating the base case from the upper surface to the lower surface and exposed from the lower surface.

8. he electromagnetic transducer of claim 7, wherein the frame further comprises a plurality of connecting segments formed on the lower surface, each connecting segment comprises a first connecting portion, a prevent collision portion, and a inclining portion extending from the first connecting portion to the prevent collision portion; wherein a vertical distance between the first connecting portion and the upper surface is higher than that between the prevent collision portion and the upper surface.

9. he electromagnetic transducer of claim 8, wherein the predetermined interval is formed between each first portion and corresponding prevent collision portion for supplying vibrating space to the spring plate.

10. The electromagnetic transducer of claim 7, wherein each first connecting arm comprises a first bending portion extending obliquely from the base body toward the lower surface and a first soldering pad extending from the first bending portion in a direction parallel to the base body and exposed from the lower surface for connecting with the elastic arm.

* * * * *